(12) United States Patent
Martinez

(10) Patent No.: US 10,324,358 B2
(45) Date of Patent: Jun. 18, 2019

(54) MULTIPLE DENSITY LENS CAP

(71) Applicant: Jeffrey Overall, Costa Mesa, CA (US)

(72) Inventor: Esteban Martinez, Huntington Beach, CA (US)

(73) Assignee: Jeffrey Overall, Fountain Valley, CA (US)

( * ) Notice: Subject to any disclaimer, the term of this patent is extended or adjusted under 35 U.S.C. 154(b) by 0 days.

(21) Appl. No.: 16/045,934

(22) Filed: Jul. 26, 2018

(65) Prior Publication Data

US 2018/0341167 A1 Nov. 29, 2018

(51) Int. Cl.
*G03B 11/06* (2006.01)
*G03B 11/04* (2006.01)

(52) U.S. Cl.
CPC ................ *G03B 11/041* (2013.01)

(58) Field of Classification Search
USPC ......................................... 396/448
See application file for complete search history.

(56) References Cited

U.S. PATENT DOCUMENTS

| | | | |
|---|---|---|---|
| 4,177,894 A | 12/1979 | Petersen | |
| 4,327,960 A | 5/1982 | Gould | |
| 4,349,266 A | 9/1982 | Maeda | |
| 4,383,565 A | 5/1983 | Denmat | |
| 5,495,676 A * | 3/1996 | Chesnut | F41G 1/383 359/511 |
| 7,270,255 B2 | 9/2007 | Badillo | |
| 7,609,512 B2 | 10/2009 | Richardson | |
| 7,997,809 B1 | 8/2011 | Lee | |
| 8,047,731 B2 * | 11/2011 | Hsu | G03B 11/043 348/375 |
| 8,118,439 B2 | 2/2012 | Cuadra | |
| 8,292,523 B2 * | 10/2012 | Dowell | G03B 11/041 359/511 |
| 9,906,259 B2 | 2/2018 | Richardson | |
| 2008/0199842 A1 | 8/2008 | Hardt | |
| 2012/0305422 A1 | 12/2012 | Vandiver | |
| 2015/0175330 A1 | 6/2015 | Ellis | |
| 2017/0285334 A1 * | 10/2017 | Meade | G02B 27/0006 |
| 2019/0056638 A1 * | 2/2019 | Decker | G03B 11/041 |

FOREIGN PATENT DOCUMENTS

DE 202015000652 U1 2/2015

OTHER PUBLICATIONS

Blain, Loz. "Kuvrd Universal Lens Cap Protects and Waterproofs Your Entire Lens Collection." New Atlas—New Technology & Science News, New Atlas, Dec. 18, 2017, newatlas.com/kuvrd-universal-waterproof-lens-cap/52647/.

* cited by examiner

*Primary Examiner* — Clayton E. LaBalle
*Assistant Examiner* — Warren K Fenwick

(57) ABSTRACT

A camera lens cap capable of coupling with a variety of lens dimensions is disclosed. An elastic sidewall integrally couples with a rigid plate. The sidewall is capable of expansion to removably couple lens barrels within a range of dimensions. The sidewall protects covered lens barrel components from scratching and other force damage. The plate covers and protects the glass lens element.

7 Claims, 5 Drawing Sheets

MULTIPLE DENSITY LENS CAP

FIELD OF INVENTION

The present invention relates to the protection of a camera lens. Specifically, it provides a lens cap capable of coupling a variety of lens barrel sizes and optimally protecting the glass element.

BACKGROUND

A variety of lens caps designed to protect a camera lens and lens barrel exist. These lens caps are made from plastic, metal or other rigid materials capable of protecting the glass and non-glass elements of a camera lens. Some lens caps are cylindrical, covering the glass lens and extending over the sides of the lens barrel. Others may cover only the glass lens element and the surrounding housing. Lens caps may attach by threading, pressure fitting, or clamping. Traditionally, lens caps have been fixed dimensions. A shortcoming with these lens caps is there inability to fit lenses of different sizes, or focal lengths. Additionally, lens barrels of similar focal lengths (56 mm, 82 mm, etc.) may be contoured differently, requiring greater lens cap tolerancing to fit different lenses of the same focal length. Lens caps constructed from rigid material may not be able to provide the requisite tolerancing, limiting compatibility to a specific model lens or to coverage of only the glass lens element.

Recently, lens caps made of flexible material, such as rubber, silicone, or similar material, have been introduced. These lens caps allow attachment to lens barrels of different sizes and easier installation and removal. Flexibility allows greater tolerancing to fit lenses of different focal lengths or dimensions. But because their flexibility causes them to indent more easily, they do not provide the protection offered by a fixed dimension lens cap comprised of rigid material. Specifically, glass lens barrels are more susceptible to damage when covered by only flexible material. Pressure may force the flexible material to indent and damage the side or frontal glass element of a lens.

A photographer often needs to be able to remove the lens quickly to capture ephemeral scenes. At the same time, a lens can cost thousands of dollars, making protection paramount. Thus, there is the need for a lens hood that both protects the glass lens element and may be easily removed. A camera lens is vulnerable to damage when dropped or otherwise contacted. The glass element of the lens is particularly susceptible to scratching and cracking. A lens hood should be able to protect a lens from such contact.

The current invention provides easy coupling with a lens barrels of varying dimensions and optimal protection of the glass lens element.

SUMMARY

A lens cap allowing flexible protective coupling is disclosed. A rigid plate couples with a flexible sidewall. The sidewall is comprised of the flexible material to allow easy installation and removal, and to increase tolerancing with different lens barrel dimensions. Sidewall flexibility allows expansion for quick attachment and removal of the lens cap.

The plate is configured to cover the surface area of the glass element of the lens, providing protection from contact. The plate may abut the lens housing or other non-glass element of the lens, allowing force to dissipate through the lens barrel and lens cap without contact to the lens glass.

The lens cap may be cylindrically shaped. The sidewall extends perpendicularly or obliquely from the plate. The plate and sidewall form an internal cavity. The cavity dimensions roughly correspond to the range of lens barrel focal lengths to be coupled. The sidewall has opposing open and coupled ends. The open end permits installation of a camera lens and lens barrel into the cavity. The coupled end conformably couples with the plate. The sidewall may be comprised of flexible material such as thermoplastic elastomer, liquid silicone rubber, thermoplastic polyurethane, or an elastomer material with similar flexible properties. A plate covering the lens may be comprised of a rigid material resistant to manual alteration and indentation. Rigid materials may have qualities similar to aluminum, brass, steel, plastic, wood or other material with similar resistance to indentation, or durometer hardness measurements. "Density" or "hardness" are used herein to refer to a material's resistance to indentation as gauged by Shore durometer or other hardness measurement scale. The Shore durometer scale of measurement is used herein to define a range of hardness of viable plates and sidewalls.

The sidewall may be integrally coupled with the plate by over-molding, other injection molding manufacturing process(es), or other methods of integral coupling. The plate may serve as the substrate for over-molding purposes. The plate may comprise a plurality of molding slots completely passing through the plate surfaces, or depressions. The sidewall may be injected through the molding slots or into the depressions in the plate. The plate may be partially covered by the material comprising the sidewall or completely embedded in the material.

The sidewall may couple with the lens barrel by rubber friction or pressure. The sidewall diameter or width is smaller or roughly the same size as the dimension range of the lens barrels it is configured to couple with. The flexibility of the sidewall enables tolerancing for installation of lens barrels of different focal lengths and configurations.

DRAWING NUMERAL LIST

Figure 1:
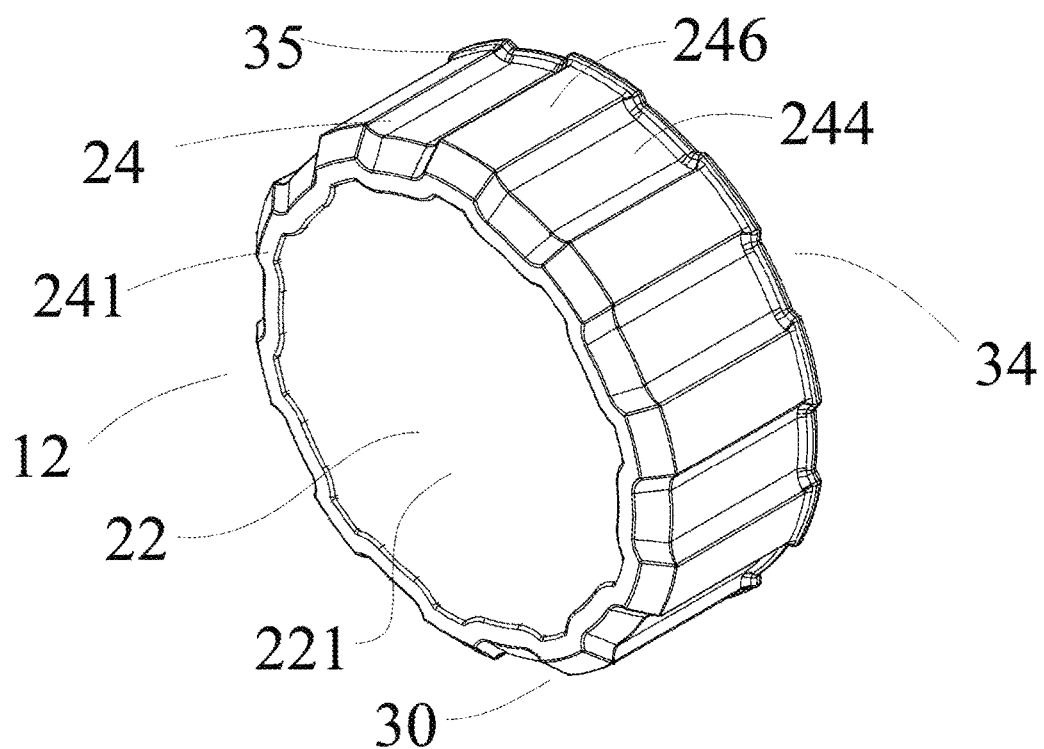
FIG. 1 is a top perspective view of a lens cap.

12 Lens Cap
22 Plate
24 Sidewall
30 Coupled End
34 Open End
35 Tab
42 Molding Slot
244 Thin Ridge
246 Thick Ridge
52 Center Axis
54 Sidewall Diameter
56 Sidewall Length
221 Outer Surface
223 Inner Surface
225 Side Surface
227 Recessed Section
229 Protruding Section
241 Coupled End Perimeter
242 Dampening Layer 244 Thin Ridge
246 Thick Ridge

DETAILED DESCRIPTION OF DRAWINGS

A relatively flat plate 22 is positioned at the front of a lens cap 12. The outer surface 221 is exposed in this embodiment. The exemplary plate is comprised of glass filled nylon with a density range of 70-100 shore durometer degrees, scale A. Other rigid materials, such as aluminum, fiberglass, may comprise the plate 22.

A sidewall 24 extends away from the plate 22. The exemplary sidewall 24 is comprised of thermoplastic elastomers ("TPE") with a 30-50 durometer range. The sidewall 24 has an opposing open end 34 and a coupled end 30. A tab 35 extends perpendicularly or obliquely from the open end 34 perimeter. In this embodiment the tab 35 encircles the entire open end 34. In other embodiments the tab 35 may be strategically placed along the open-end perimeter 34 or positioned at another location on the sidewall. The coupled end 30 integrally couples with the plate 22. A coupled end perimeter 241 extends over a portion of a plate 22 because of the over-molding process used in this embodiment. The coupled end perimeter 241 forms the portion of the sidewall 24 abutting and conformably coupling the plate 22. The coupled end perimeter 241 may be chamfered to remove unnecessary sidewall material and allow the sidewall 24 circumference to be greater than the plate 22 circumference.

Figure 2:
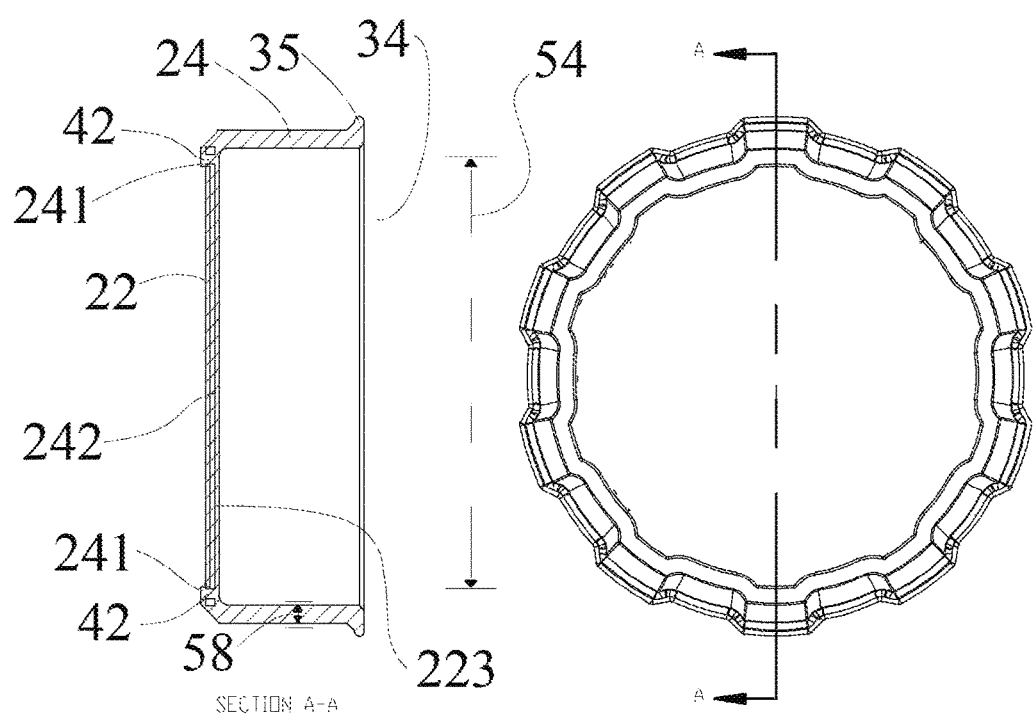
FIG. 2 is an exploded top perspective view.

The sectional view provided in FIG. 2 shows the coupled end perimeter 241 extending over the plate 22. The coupled end perimeter 241 may only partially cover the surfaces of the plate 22, or it may completely cover the plate 22. In this embodiment the outer surface of the plate 22 is only covered along the perimeter portion of the outer surface 221. The inner surface 223 is completely covered by a dampening layer 242.

The plate 22 is roughly cylindrical, with the outer surface 221 facing away from the cavity, an opposing inner 223 surface, and a relatively thin intermediate side surface 225. The perimeter of the plate 22 may be configured for conform to the shape of the coupled end perimeter 241. In this embodiment the plate has alternating recessed 227 and protruding sections 229 to correspond with the contours of the sidewall 24.

Figure 3:
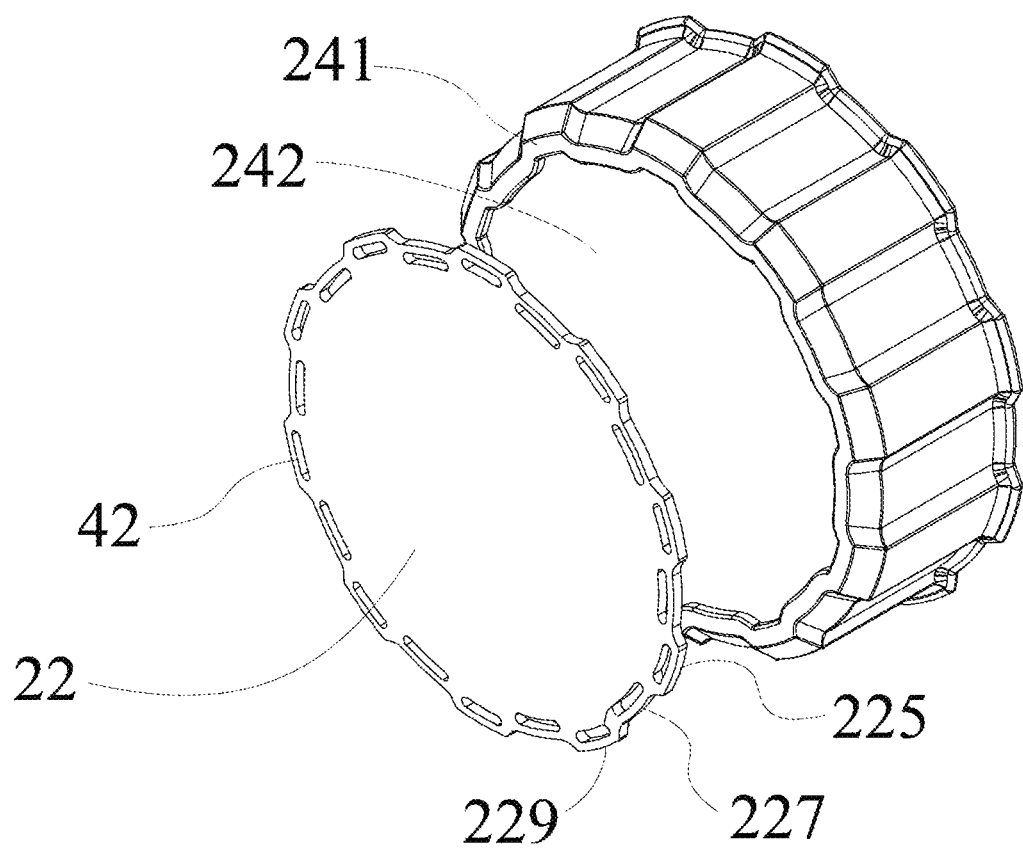
FIG. 3 is a right-side sectional view of the lens cap.

Molding slots 42, as seen in FIG. 2-3, line the perimeter of the plate. The molding slots 42 are positioned to align with the coupling perimeter 241. The sidewall 24 material passes through and surrounds the molding slots 42 and the adjacent surfaces of the plate 22 to conformably couple. The coupling perimeter 241 covers some of the plate 22 surface to couple, causing outer surface of the plate 221 to be debossed relative to the coupling perimeter 241. The inner surface of the plate 22 abuts and couples with the dampening layer 242. The dampening layer 242 may be comprised of or other material with less resistance to indentation then the material comprising the plate 22. The dampening layer 242 may reduce likelihood of scratching or other damage to the lens barrel if the plate is forced towards the lens. The inner surface of the plate 223 may have indentations (not shown) into which the dampening layer 242 may be injected to increase coupling strength.

The tab extends 35 away from the sidewall 24. In this embodiment the tab 35 is an extension of and integrally connected with the sidewall 24. The tab 35 may extend from the sidewall perpendicularly or obliquely 1-10 mm.

The sidewall 24 has alternating thin ridges 244 and thick ridges 246. The alternating ridges may prevent shrinkage during manufacturing. The exemplary embodiment is manufactured by an injection molding process. During an injection molding process internal pressures may form, causing the part to warp when it is ejected from a mold. The greater the thickness of a body, the more likely it is to shrink or warp. The alternating thin ridges 244 in this embodiment reduce the chance of such warpage. The thick ridges 246 enhance protection of the covered aspects of a coupled lens barrel. The sidewall thickness 58, as identified in FIG. 2, may be 0.5-8 mm, depending on the size of the lens barrel to be coupled. The relative dimensions of the thick 246 and thin ridges 244 are determined based on the molding shrinkage ratio principles.

Figure 4:
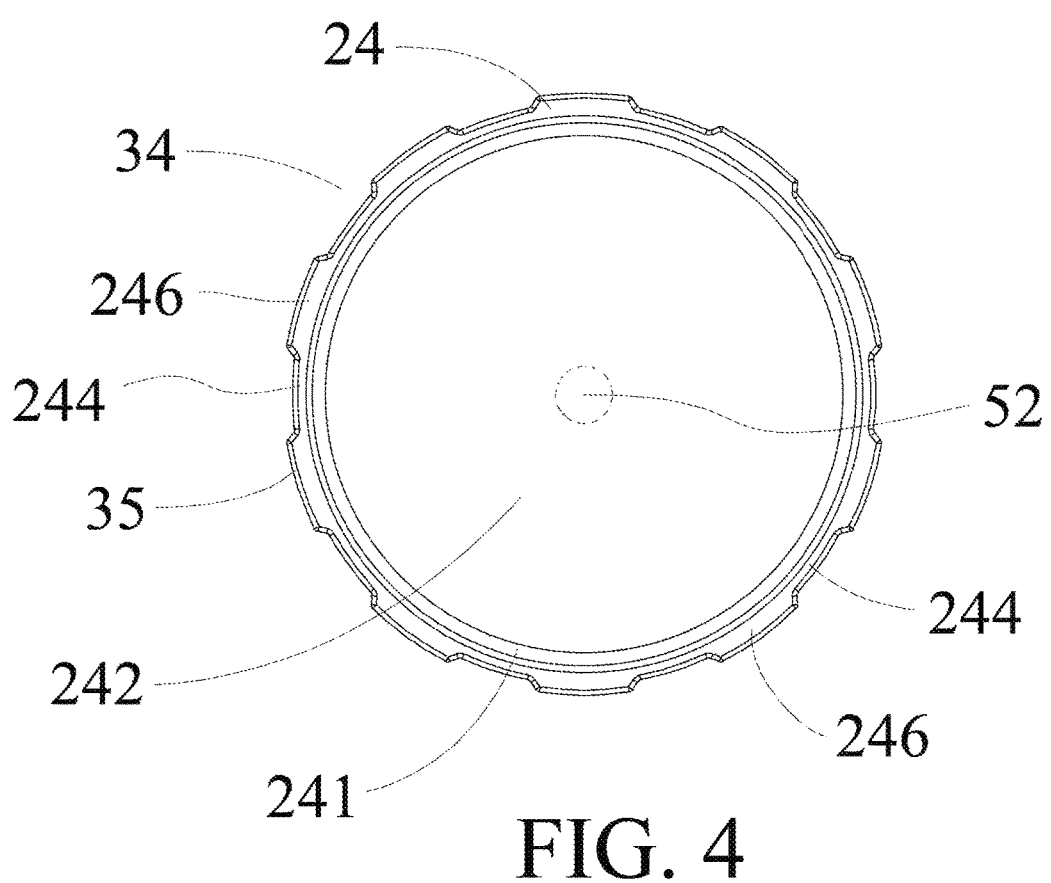
FIG. 4 is a back-side view of the lens cap.
Figure 5:
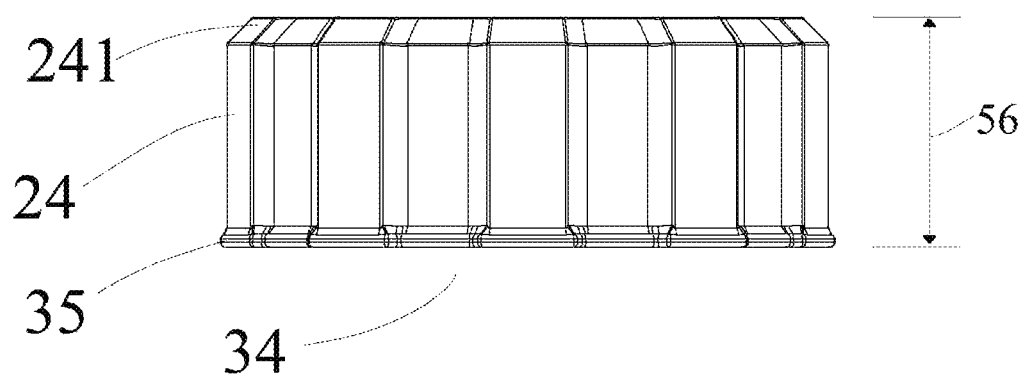
FIG. 5 is a side view of the lens cap.

The sidewall 24 can expand from its unstressed position away from the center axis 52, which is depicted in FIG. 4. This expansion allows a lens barrel to be installed. When the expansive force ceases, the sidewall 24 exerts pressure back toward the unstressed position and couples by interference fit with an installed lens barrel. The diameter 54 of the sidewall 24 may be smaller than the diameter of the lens barrel to allow coupling. For example, a sidewall 24 may have a diameter of 74 mm if configured to fit lens barrels with diameters ranging from 76-86 mm. The diameter of the plate 22 may be sufficient to cover the entire glass lens element and extend over the non-glass perimeter of the lens. This configuration ensures the plate 22 will contact a non-glass aspect of the lens if contacted on the outer surface 221 or the coupled end perimeter 241.

The length 56 of the sidewall 24 may be configured to cover crucial components of a lens barrel. The exemplary sidewall 24 is configured to cover the critical focus ring on some lenses. The sidewall 24 may also be of sufficient length 56 to act as a zoom lens lock for lenses lacking such a mechanism.

The foregoing discussion discloses and describes merely exemplary embodiments. As will be understood by those familiar with the art, the disclosed subject matter may be embodied in other specific forms without departing from the essence or characteristics thereof. Accordingly, the foregoing disclosure is intended to be illustrative, but not limiting, of the scope of the invention, which is set forth in the following claims.

I claim:

1. A camera lens cap comprised of at least two materials, comprising:
    a. a plate comprised of rigid material, said plate comprising opposing outer and inner surfaces and an intermediate side surface;
    b. a sidewall comprised of elastic material, having an open end and a coupled end, the coupled end conformably coupling with the plate;
    c. an open portion at the end of the sidewall opposing the inner surface of the plate;
    d. said sidewall and said plate forming a cavity;
    e. an open portion at the end of the sidewall opposing the plate;
    f. said plate being comprised of a harder material than the material comprising the sidewall.

2. The camera lens cap in claim 1, wherein a pull-tab extends from the sidewall.

3. The camera lens cap in claim 1, wherein the sidewall extends to form a dampening layer, said dampening layer abutting and covering at least portion of the inner surface of the plate.

4. The camera lens cap in claim 1, wherein the plate has at least one molding slot penetrating the plate, the sidewall passing through and surrounding said molding slot.

5. A camera lens cap, comprising:
a. a plate comprised of rigid material, said plate comprising opposing outer and inner surfaces and an intermediate side surface;
b. a sidewall comprised of elastic material, having an open end and a coupled end, the coupled end conformably coupling with the plate;
c. said plate having at least one molding slot penetrating the plate, the sidewall passing through and surrounding said molding slot;
d. an open portion at the end of the sidewall opposing the inner surface of the plate;
e. said sidewall and said plate forming a cavity;
f. an open portion at the end of the sidewall opposing the plate.

6. A camera lens cap, comprising:
a. a plate comprised of rigid material, said plate comprising opposing outer and inner surfaces and an intermediate side surface;
b. a sidewall comprised of elastic material, having an open end and a coupled end, the coupled end conformably coupling with the plate;
c. an open portion at the end of the sidewall opposing the inner surface of the plate;
d. said sidewall and said plate forming a cavity;
e. an open portion at the end of the sidewall opposing the plate;
f. a pull-tab extending from the sidewall.

7. A camera lens cap, comprising:
a. a plate comprised of rigid material, said plate comprising opposing outer and inner surfaces and an intermediate side surface;
b. a sidewall comprised of elastic material, having an open end and a coupled end, the coupled end conformably coupling with the plate;
c. said sidewall extending to form a dampening layer, said dampening layer abutting and covering at least portion of the inner surface of the plate;
d. an open portion at the end of the sidewall opposing the inner surface of the plate;
e. said sidewall and said plate forming a cavity;
f. an open portion at the end of the sidewall opposing the plate.

* * * * *